United States Patent [19]

Clarke

[11] 4,009,287
[45] Feb. 22, 1977

[54] CONTAINERS FOR PACKAGING LIQUIDS

[75] Inventor: Kenneth Clarke, Knebworth, England

[73] Assignee: Imperial Chemical Industries Limited, London, England

[22] Filed: July 31, 1975

[21] Appl. No.: 600,801

Related U.S. Application Data

[63] Continuation of Ser. No. 385,736, Aug. 6, 1973, abandoned.

[30] Foreign Application Priority Data

Aug. 24, 1972 United Kingdom ............ 39413/72

[52] U.S. Cl. .................................. 426/106; 150/6; 206/525; 229/55; 229/65; 426/410
[51] Int. Cl.² .................. B65D 85/72; B65D 77/14
[58] Field of Search ............... 229/65, 55; 206/525; 150/6; 426/106, 410

[56] References Cited

UNITED STATES PATENTS

| | | | |
|---|---|---|---|
| 1,526,782 | 2/1925 | Fleischer | 229/65 |
| 1,753,458 | 4/1930 | Willis | 150/6 |
| 2,259,855 | 10/1941 | Martinet | 150/6 |
| 2,601,568 | 6/1952 | Sussenbach et al. | 229/65 |
| 3,141,221 | 7/1964 | Faulls, Jr. | 206/1.5 |
| 3,331,501 | 7/1967 | Stewart, Jr. | 229/55 |
| 3,414,140 | 12/1968 | Feldkamp | 229/65 |
| 3,554,434 | 1/1971 | Anderson | 229/55 |
| 3,620,774 | 11/1971 | Ford et al. | 229/55 |

FOREIGN PATENTS OR APPLICATIONS

| | | | |
|---|---|---|---|
| 1,437,179 | 12/1966 | France | 206/219 |
| 1,458,178 | 11/1966 | France | 229/65 |

*Primary Examiner*—William Price
*Attorney, Agent, or Firm*—Cushman, Darby & Cushman

[57] ABSTRACT

A container for packaging fluids under superatmospheric pressure comprises a length of flexible tubular plastics film, which at one end or at each end is flattened and folded transversely through 180° around a rod and is rigidly enclosed along the fold around the rod by a strip of malleable material, the length of the strip and the rod being at least as great as the lay-flat width of the tubular film.

10 Claims, 6 Drawing Figures

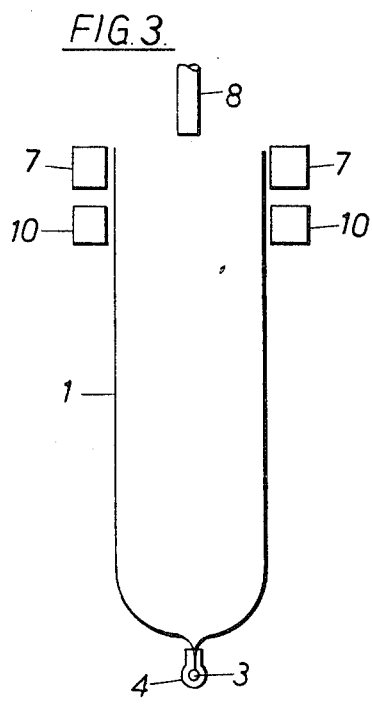
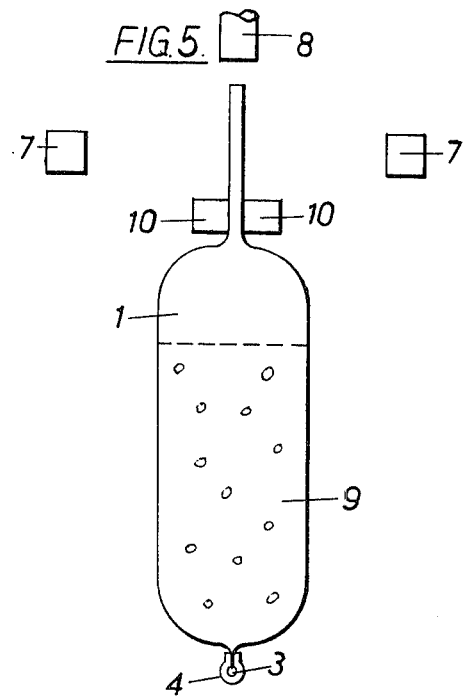
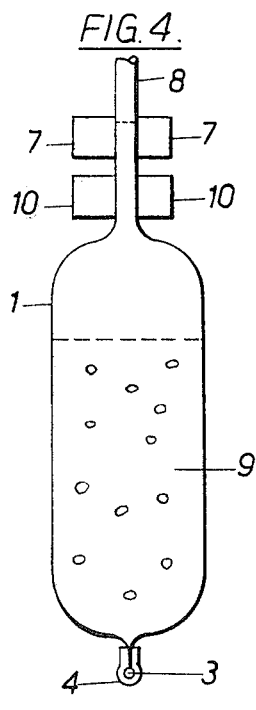
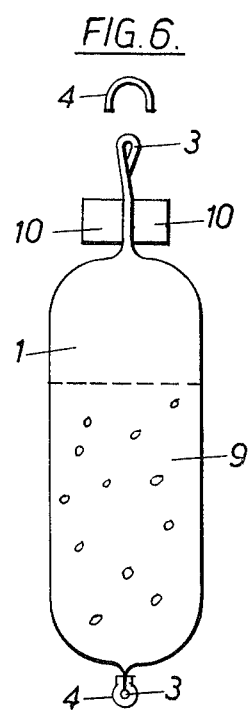

CONTAINERS FOR PACKAGING LIQUIDS

This is a continuation of application Ser. No. 385,736 filed Aug. 6, 1973 and now abandoned.

This invention relates to containers for packaging fluids at superatmospheric pressure. A container for packaging a fluid such as a carbonated beverage may be made from a length of flexible tubular thermoplastics film, as described for example in British Patent specification Nos. 1,241,948; 1,251,672; 1,254,099 and 1,302,450. The present invention provides a new method of sealing one or both ends of such containers.

According to the invention, a container for packaging fluids at superatmospheric pressure comprises a length of flexible tubular plastics film, which at least at one end is flattened and folded transversely through 180° around a rod and is tightly enclosed continuously along the fold around the rod by a strip of malleable material crimped upon it, the length of the strip and the rod being at least as great as the lay-flat width of the tubular film, to provide a gas-tight closure.

The empty container may initially be sealed at each end and then filled through an aperture in its wall, for example as described in British Patent specification No. 1,251,672. Alternatively, the container may initially be sealed only at one end and then be filled through the other end, as described hereinafter, which is then sealed. Conveniently each end of the container is sealed by means of the present invention.

The closure of the invention is self-sealing. Provided tha the turned-over end is clamped firmly between the rod and the malleable strip, the greater the internal pressure in the container the greater is the sealing pressure upon the film layers within the closure. No heat seal or other seal is required between the inner surfaces of the tubular film. Probably the most important sealing mechanism in the closure depends on the tendency of the pressure inside the container to force the enclosing strip off the end, which is prevented by the clamping effect between the strip and the rod and results in a sealing pressure across the layers of film between the rod and the enclosing strip. Another possible sealing mechanism depends on the tendency of the pressure inside the container to open the layers of film thus forcing the rod to one side against the enclosing strip and creating a sealing pressure there across the layers of film. The invention does not however depend on the accuracy of these explanations of the sealing action, and other explanations may be possible.

The contents may be gas and/or liquid, for example beer or other carbonated beverages, under a superatmospheric pressure ranging from about 30 $kN/M^2$ (about 5 p.s.i.) for a lightly carbonated beverage under cold conditions to as much as 400 $kN/m^2$ (about 60 p.s.i.) for a highly carbonated product under very warm conditions. The central substantially cylindrical portion of the package is conveniently wrapped cylindrically with paper or the like to protect the tubular film from accidental rupture and provide a medium for labelling the product as well as a stiff sleeve for the opened package after the pressure has been released. The end of the package sealed by means of the invention, however, has the lay-flat width of the tubular film and cannot be accommodated inside the cylindrical sleeve. To protect the film near the ends from accidental rupture, therefore, it should desirably be strengthened by external lamination to reinforcing strips of flexible sheet material. These may be of film or of paper; they preferably extend externally down the container to the part that will assume a substantially cylindrical form when the container is inflated: that is, sufficiently far from the edges of the reinforcing strips to lie within the cylindrical sleeve in the finished package.

The tubular film for the containers is conveniently of biaxially oriented poly(ethylene terephthalate); although other thermoplastic polyesters, such as poly(ethylene diphenoxyethane-4,4'-dicarboxylate) or polymers of similar mechanical properties, may be used. Certain nylons, and some uniform copolymers of acrylonitirile and styrene containing 86–93 mole % acrylonitirile preferably toughened with particles of a compatibly grafted rubber, may for example be suitable. Biaxially oriented tubular film of poly(ethylene terephthalate) as described in British Patent specification No. 1,271,694 is especially suitable, particularly when coated with a gas-impermeable coating of, for example, a vinylidene chloride copolymer. The wall thickness of the tubing must generally be greater the greater its lay-flat width, and the thickness required naturally depends on the mechanical properties of the plastics film concerned. A wall thickness of at least 20 $\mu$m (e.g. 30–450 $\mu$m) is generally adequate for biaxially oriented poly(ethylene terephthalate) tubular film having a lay-flat width of 50–200 mm. The thickness of adherent reinforcing web used to strengthen the ends of the container is preferably at least as great as the thickness of the tubular film.

The diameter of the rod used in the closure of the invention is preferably at least as great, and conveniently from 2 to 4 times as great, as the total folded-over thickness of the film layers — i.e. the sum of the thickness of four layers of film and adherent reinforcing web (if any). The rod may be of any rigid or resilient material and is conveniently a metal rod or a length of plastics monofilament for example nylon, thermoplastic polyester or poly(propylene). The ends of a flexible monofilament can extend beyond the closure and may be joined together externally to form a handle for the package.

The strip to enclose the folded film around the rod is of malleable material, so that it can be crimped into places and is relatively free from creep. Conveniently it is of metal, such as for example steel (which may be galvanized or coloured), stainless steel, or aluminum; most plastics have inadequate mechanical properties for the purpose. For a rod of 0.5–1 mm diameter and a total folded-over film thickness of 300–600 $\mu$m, a strip of sheet steel 0.3–0.5 mm thick is generally suitable. The width of the strip is at least sufficient for it to be crimped around the fold of film surrounding the rod, and may if desired be greater so that when crimped over the fold the strip forms parallel flanges lying on each side of the adjacent film.

An opening device may be incorporated in the container. For example, it may be of the type described in French patent publication No. 2,143,269 (British cognate application Nos. 29904/71; 29905/71 and 60732/71). Such opening device consists in a port in at least one of the two faces of one end of the container, the or each port being sealed by a removably adhered patch of gas-tight flexible material to provide an emptying port for the package. Preferably there are two such emptying ports, one on each face of the package end, preferably with both covered by patches, or by different adhered portions of the same patch. This arrangement permits one port to be used as the outlet for the liquid contents of the package and the other to allow air to enter the package. When the ports are covered by different portions of a single patch, the patch may conveniently be a strip extending over the end of the package, left unadhered at one or both ends to provide a tag or tags for its removal from the ports.

One preferred form of the container and package of the invention, and a method of filling the container, will now be described by way of example with reference to the accompanying drawings, of which:

FIGS. 3 to 6 show the container, already sealed at the lower end, being filled and sealed at the upper end.

Figure 1:
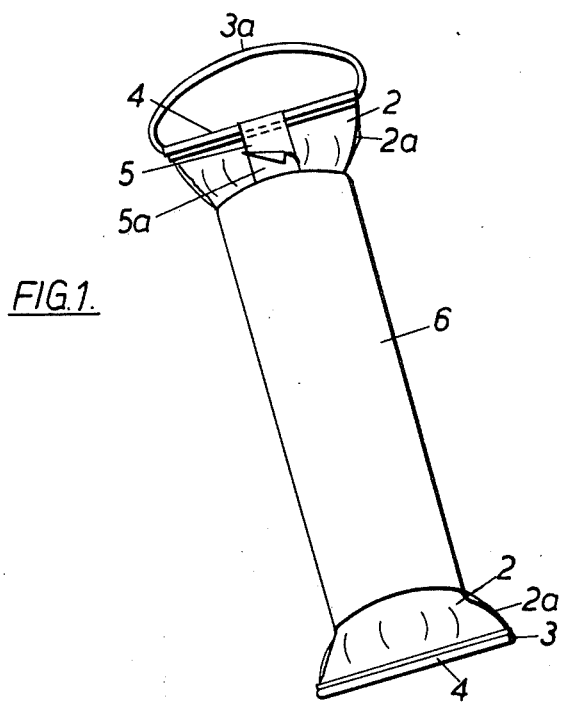
FIG. 1 shows a filled container in perspective.
Figure 2:
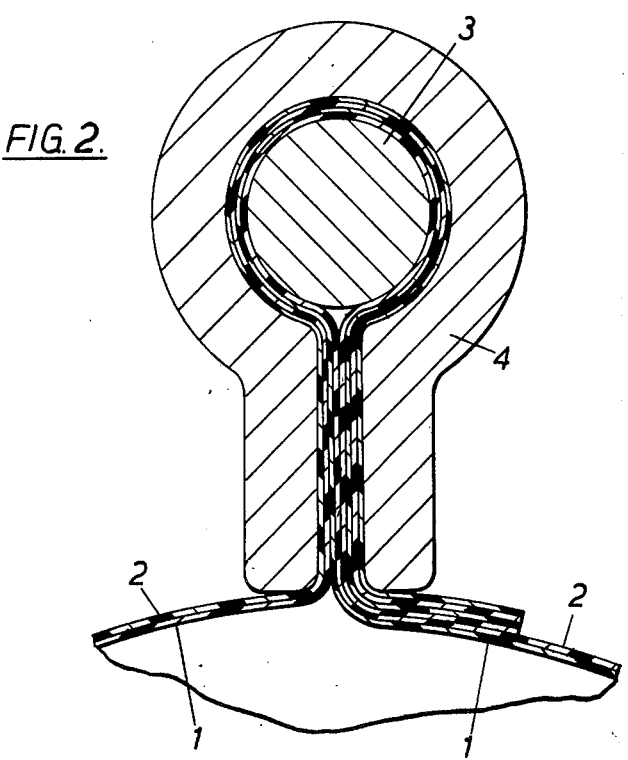
FIG. 2 is a partial longitudinal section of one end of such a container showing the rod, closure member and layers of film in cross section.

In FIGS. 1 and 2: 1 (FIG. 2) is the length of flexible tubular plastics film forming the body of the container, its end regions being reinforced by strips, 2, adhered externally to the surface of the tubular film, and extending somewhat beyond the side-folds thereof, where they are adhered to each other to form narrow fins, 2a. Each end of the tubular film has been flattened and folded through 180° around a flexible rod member, 3, and is tightly enclosed upon the rod member by a malleable strip member, 4, clamped around it; a fluid-tight seal across the layers of film is thus provided. This is shown more particularly in FIG. 2, where the rod member 3 and strip member 4 are seen in cross section, with the tubular film 1 and the adherent reinforcing film 2 lying between them. The opposing surfaces of the tubular film 1 are not stuck together, in distinction from known end-seals for fluid-tight containers of tubular film. At one end of the package the free ends of the flexible rod member 3 are optionally joined to form a handle, 3a, for the package; at the other end they are cut off substantially flush with the ends of the strip member 4. 5 is a patch covering an emptying port, the patch extending over the end of the package to cover, similarly, a second port on the other face of the end of the package. The free end of the patch is folded back and projects, to form an opening tag, 5a, from the cylindrical paper sleeve, 6, which tightly surrounds and supports the central part of the package.

As explained above, the container may be formed initially with both end-seals completed and then filled through an aperture in its wall, as described in British Patent specification No. 1,251,672. Alternatively, only the lower end is sealed initially and the container is filled through the other end, which is subsequently sealed. Such a method will now be described with reference to FIGS. 3 to 6 of the accompanying drawings, where the lower end has already been reinforced and sealed with members 3 and 4 (and provided if desired with an opening strip and handle), as described above. The method is described by way of example with particular reference to the packaging of a carbonated beverage in the container.

An upper sealing clamp 7 holds the unclosed end of the container open (by means of vacuum) and beneath a filling nozzle 8, which is then lowered into the open end (see FIG. 3). The upper sealing clamp then clamps the end of the tubular film around the nozzle to make a pressure-tight joint, and the container is pressurized to a desired pressure by the introduction of gas through the nozzle. Thus, for packaging a carbonated beverage, the container is pressurized, with carbon dioxide, preferably to the pressure upon the beverage in the reservoir from which the beverage is supplied. The nozzle then delivers a predetermined amount of the carbonated beverage at the desired pressure into the container (see FIG. 4). The liquid may be pumped into the container or run into it under gravity. The liquid is preferably chilled, e.g. to 5° C.

A second sealing claim 10 is also applied in an almost closed position just below the upper sealing clamp 7. After the container has been filled under pressure this lower clamp closes tightly across the tubular film to form a temporary pressure-tight seal, and the upper clamp is released and the nozzle is withdrawn (see FIG. 5).

With the lower clamp 10 holding it with its contents 9 under pressure, the container is passed from the filling station to a station at which adhesive reinforcing tapes 2 are pushed together by clamps (not shown in the drawings) on to the free upper end of the tubular film. Alternatively, these strips may already have been applied during the making of the container. This is in fact much preferred, since the strips for both ends may readily be applied during a single step of the process; it also allows the air-space in the finished package to be much smaller than if space had to be left for the strips to be applied after filling.

The container is then passed to a third station at which the reinforced upper end of the tubular film is folded through 180° around a rod member 3 and a strip of malleable material 4 is crimped around the fold, exactly as described for the seal at the lower end of the container (see FIG. 6). If a handle is required, and has not been provided at the lower end of the container, the rod member for the upper end may be supplied from a magazine in the form of a joined loop to serve as the handle in the finished package.

The lower clamps are then finally released and the sealed package may then be wrapped with a cylindrical paper sleeve, 6, as described in French specification No. 7,228,533 (British application No. 37300/71). In this process: (1) the package is constrained by mechanical means to a part-cylindrical form over more than half but less than the whole of its perimeter and at least over that part of its length to which the sleeve is to be applied; (2) the leading end of the paper strip which is to form the sleeve is adhered to the surface of the package; (3) the package is rotated against said mechanical means so that the leading edge of the strip is received between the mechanical means and the package; (4) such rotation is continued through more than one whole revolution of the package, so causing the strip to be wrapped round the package; and (5) the trailing end of the strip is adhered to the underlying portion thereof. The cylindrical paper sleeve 6 thereby produced overlaps the reinforcing webs 2 applied to the ends of the container, and the fold of tape 5 of the opening device (see FIG. 1).

In one particular example of a container and package formed as described with reference to the drawings, the container is formed from a length of about 260 mm of biaxially oriented tubular poly(ethylene terephthalate) film made as described in British Patent specification No. 1,271,694, having a lay-flat width of 70 mm and a wall thickness of 36 $\mu$m, and bearing a 3 $\mu$m-thick coating of vinylidene chloride copolymer. It will hold about 300 cm$^3$ of beer or other carbonated beverage at a superatmospheric pressure of about 100 kN/m$^2$ (about 15 p.s.i.) at about 20° C. Each end portion of the container is strengthened by the lamination to the tubular film of pairs of strips 2 of biaxially oriented poly(ethylene terephthalate) film 40 μm thick, each slightly longer than the lay-flat width of the tubular film, so that they form side fins 2a, and each sufficiently wide to be ultimately overlapped by the edge of a supporting sleeve at each end of the package. The two opening ports are covered by a single tape of biaxially oriented poly(ethylene terephthalate) film 50 μm thick and 25 mm wide, coated with a 12 μm-thick coating of polyester adhesive. This tape is sealed over the ports after the end closure has been applied. It is left unattached to the container where it crosses the end closure, and also at one of its ends which is also sufficiently long to be folded back to provide an opening tag, as shown in FIG. 1 of the drawings. The rod member 3 of the closure is a nylon monofilament, for example of nylon 6:6, having a diameter of 0.9 mm. The strip member 4 is a strip of sheet steel 0.4 mm thick, shaped first to a U-shaped cross-section and then crimped firmly over the folded film surrounding the monofilament. In the finished package, the central portion of the container is supported by a cylindrical paper sleeve 6 which tightly surround it. The sleeve is suitably of 90 g/m² paper, wound 2.25 times round the package after filling.

Although the invention has been described with reference to a package in which both ends are similarly sealed, one end can instead be sealed in the manner described in British Patent specification No. 1,302,450. Likewise, although the invention has been described with reference to a particular method of filling the package, it may instead be filled by the method described in British Patent specification No. 1,251,672.

It has previously been proposed to provide closures for temporarily sealing the ends of plastics-film tubular containers suitable for household use, the closures comprising an inner elongated rod around which the end of the container is folded, and an outer resilient clamp removably and resiliently embracing the doubled tubing around the rod, such that the container end may first be folded around the rod and the rod, with the throat of the container folded round it, may be pushed into the resilient clamp from one end thereof. The closures are thus adapted to be easily opened and reclosed, for the contents of the package to be removed in small portions or for the container to be used over and over again. Such a closure could not be used in the packaging of fluids at pressures as high as those contemplated in respect of the present invention, since, if the closure were removable by hand, it would be blown off the end of the pressurized pack. It has previously been considered impossible to provide a mechanical closure for plastics-film containers for beer and other carbonated drinks, without also adhesively sealing the film surfaces at the closure.

We claim:

1. A package containing a carbonated beverage at superatmospheric pressure and made from a length of flexible tubular thermoplastics film sealed at each end by a gas-tight enclosure such that the greater the internal pressure in the container the greater is the sealing pressure upon the film within the enclosure, said gas-tight closure includes a flattened end of the tubular film folded transversely through 180° around a rod and a strip of malleable material of U-shape cross-section crimped over the folded film along the fold around the rod and enclosing tightly and continuously the turned over end of the film and clamping it firmly between the rod and the malleable strip, the length of the strip and the rod being at least as great as the width of the tubular film when in the lay-flat condition.

2. A package as claimed in claim 1 in which the rod is flexible.

3. A package as claimed in claim 2 in which the rod is a plastics monofilament.

4. A package as claimed in claim 1 in which reinforcing strips of flexible material are externally laminated to each face of each end of the length of tubular plastics film, and are included in the folded-over end.

5. A package as claimed in claim 1 in which the diameter of the rod is from 1 to 4 times as great as the total folded-over thickness of the film layers surrounding it.

6. A package as claimed in claim 1 in which the strip of malleable material is of sheet steel.

7. A package containing a carbonated beverage at superatmospheric pressure comprising a length of flexible tubular thermoplastics film sealed at each end by a gas-tight closure such that the greater the internal pressure in the container the greater is the sealing pressure upon the film layers within the enclosure, said gas-tight closure includes a flattened end of the tubular film folded transversely through 180° around a rod and a strip of malleable material of U-shape cross-section crimped over the folded film along the fold around the rod and enclosing tightly and continuously the turned over end of the film and clamping it firmly between the rod and the malleable strip, the length of the strip and the rod being at least as great as the width of the tubular film when in the lay-flat condition, a sleeve for a central substantially cylindrical portion of the tubular film situated inwardly of the flattened and sealed ends, said sleeve including a strip of paper wrapped around said portion and having an end adhered to an underlying surface thereof.

8. A package according to claim 7 wherein the tubular thermoplastics film is a biaxially oriented poly(ethylene terephthalate) film.

9. A package according to claim 8 wherein the ends of the tubular film are strengthened by reinforcing strips of flexible material externally laminated to said ends and extending down the container sufficiently far to lie within the paper sleeve.

10. A package according to claim 8 incorporating an opening device in the form of a removably adhered patch overlying a port in at least one of the two faces of one end of the container the faces lying outside the area covered by the paper sleeve.

* * * * *